J. C. CONCKLIN.
Straw Cutter.

No. 3,066. Patented May 2, 1843.

UNITED STATES PATENT OFFICE.

JNO. C. CONCKLIN, OF PEEKSKILL, NEW YORK.

STRAW-CUTTER.

Specification of Letters Patent No. 3,066, dated May 2, 1843.

*To all whom it may concern:*

Be it known that I, JOHN C. CONCKLIN, of Peekskill, in the county of Westchester and State of New York, have invented a new and useful Improvement in Machines for Cutting Straw and other Substances; and I do hereby declare that the following is a full and exact description thereof, reference being had to the annexed drawings of the same, making part of this specification.

Figure 1:
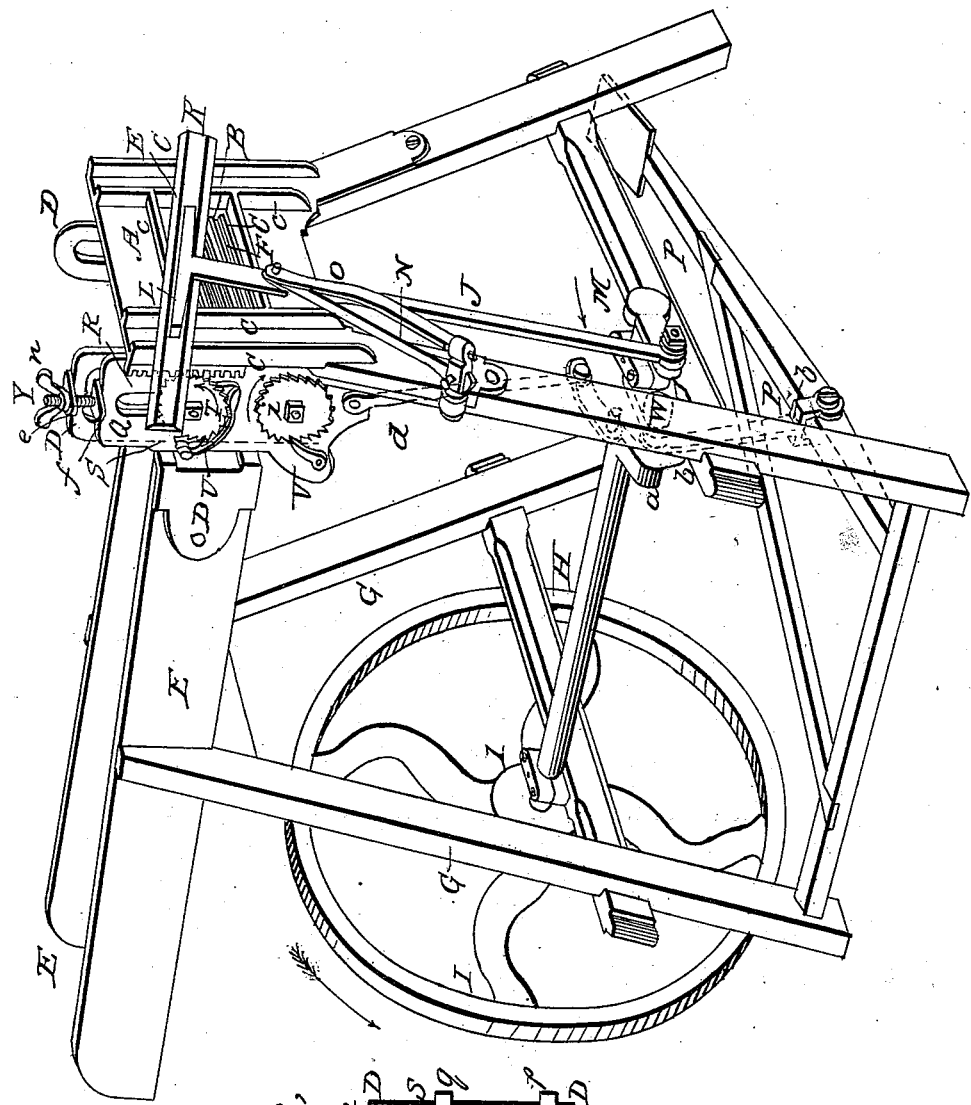
Figure 2:
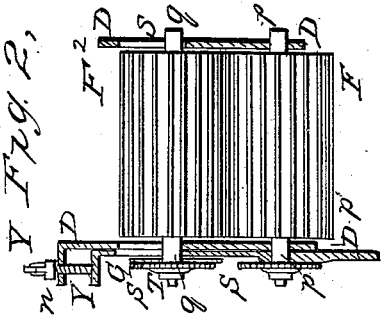

Figure 1 is a perspective view of the machine. Fig. 2 vertical transverse section of the feeding apparatus.

The nature of my invention consists in giving to the knife an oblique stroke similar to that produced with the draw knife while in the operation of cutting by means of a crank on the main shaft and a rod or side arm attached to the front plate of the box and in so constructing the feeder as to operate with equal pressure on the straw or other substances while in the operation of feeding and also in the movements of the feeder whereby any required length may be given to the cut feed.

In order to facilitate the operation of manufacturing and giving strength and durability to the machine I make a cast iron plate A that forms the front of the box having an aperture B through which the straw or other substances passes to the knife on the front of this plate are projections or ribs C against which the edges of the concave surface of the knife are pressed while in operation. These ribs or projections tend to strengthen the plate and to sharpen the knife. The lower corners of this front plate extend downward and outward in such a position as to suit the angles of the two front legs, and to which legs said corners are firmly fastened by means of screw bolts. Directly behind this front plate and at each side of the aperture or mouth a flanged plate D is attached with screw bolts which I call a cheek extending backward at right angles with the front plate and which connects the said front plate with the box E.

Two fluted cylinders or feeders F F² are made of any required length or diameter having a pivot at each end. These cylinders or feeders are placed horizontally directly behind the front plate A: the under fluted cylinder F is so placed that the upper surface of it comes nearly in a horizontal line with the bottom of the box and turns upon its pivots $p$ in holes made to receive them in the cheeks D (see Fig. 2). The axles or pivots $q$ of the upper cylinder or feeder F² work in grooves or slots $s$ made in the cheeks D and also a slot in the sliding rack plate Q, R so as to permit it to rise or fall according to the quantity of straw or other substance passing between it and its corresponding fluted feeder F below. This upper cylinder or feeder is made of solid metal and rests upon the straw or other substance holding it firm upon the lower feeder while the knife is in the operation of cutting. At a convenient distance from the front of the box two other legs G G are attached which, together with the front legs, and the connecting pieces framed into them at a proper distance from the ground form the support of the machine and on which rests a crank shaft H that turns in boxes having a fly wheel I on its rear end of sufficient weight to give force to the knife K. At the opposite end of the shaft and directly in front of the box is the crank M which gives motion to the knife K; said crank is connected with the knife by means of a shackle bar or pitman J and T head or staple L. When the shaft is put in motion this crank gives a pitch to the knife and in conjunction with the side arm N also gives to the knife an oblique draw knife stroke so much desired in machines for cutting straw with a vibratory knife. The knife is made straight with two edges one of which is ground at a time and of any length or breadth required. It is also made concave on one side and convex on the other—the concave side working against the ribs or projections of the aforesaid plate A. A spiral or other spring O is connected with the aforesaid side arm or rod N and presses firmly against the shackle bar or pitman a little below the knife keeping the knife to its place. The knife is easily detached from the machine by pressing off the aforesaid arm N with the finger at the same time contracting the spring O. Another crank $a$ is made to the shaft a little back of the cross bar on which its shaft rests to which a hand lever or foot treadle P is attached by means of a pitman $b$ whereby the machine is put in motion.

In order to give motion to the feeders I make a plate Q with a rack R attached to it that slide against one of the cheeks D having a corresponding cog wheel S that meshes into the said rack turning loosely on one of the pivots or axles $q$ of the upper cylinder or feeder $F^2$; on the outside of this toothed wheel a ratchet wheel T is firmly fastened to the pivot or axle $q$ of the feeder which is connected to the toothed or cog wheel S by a catch U in such a manner as to give the upper feeder $F^2$ a proper motion when the rack moves up or is made to ascend. The under feeder F is simultaneously put in motion in a contrary direction (as represented by arrows) by means of a similar ratchet wheel $i$ fixed to its axle $p$ and a pawl or catch V attached to the sliding rack plate Q R; this sliding rack plate Q R is made to move by means of a cam W (represented by dotted lines) on the crank shaft H underneath the rack plate Q R to which it is attached by a connecting rod $d$. At the top of the sliding rack there is a screw Y which runs through a projecting portion or head $e$ of the cheek into the head $f$ of the sliding rack plate Q and by turning a thumb nut $n$ on said screw the feed is cut to any length required by changing the sweep or hold of the handles or pawls U, V, which is effected by thus raising or lowering the rack plate Q. The feeding rollers F $F^2$ turn as the rack plate rises which takes place as the knife is raised; and they remain stationary as the plate and knife descend—the pawls slipping over the teeth of the ratchet wheels.

What I claim as my invention and which I desire to secure by Letters Patent is—

1. Giving the knife an oblique drawing stroke in the manner and by the means above set forth; or by other means substantially the same.

2. The manner of feeding by means of the combination of the rack slide Q R ratchets T $i$ pawls U V and pinion S.

3. The method of regulating the length of cutting by means of the screw Y attached to the upper ends of the rack slide Q, R and cheeks D as described.

4. The construction and arrangement of the ribbed front plate for the purpose and in the manner set forth.

JOHN C. CONCKLIN.

Witnesses:
 WM. P. ELLIOT,
 JAMES TAYLOR.